(12) United States Patent
Osborn et al.

(10) Patent No.: US 12,073,273 B2
(45) Date of Patent: Aug. 27, 2024

(54) TECHNIQUES TO DETECT AND PROVIDE AN INDICATION OF AN EVENT ON A CONTACTLESS CARD

(71) Applicant: Capital One Services, LLC, McLean, VA (US)

(72) Inventors: Kevin Osborn, Newton, MA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 39 days.

(21) Appl. No.: 17/231,182

(22) Filed: Apr. 15, 2021

(65) Prior Publication Data

US 2022/0335265 A1 Oct. 20, 2022

(51) Int. Cl.
*G06K 19/06* (2006.01)
*G06K 19/07* (2006.01)
*G06K 19/077* (2006.01)
*H04W 4/80* (2018.01)

(52) U.S. Cl.
CPC .......... *G06K 19/07707* (2013.01); *G06K 19/0709* (2013.01); *G06K 19/07767* (2013.01); *H04W 4/80* (2018.02)

(58) Field of Classification Search
CPC ........... G06Q 20/341; G06Q 20/352; G06Q 20/3278; G06Q 20/34; G06Q 20/401; G06K 19/07707; G06K 7/10732; G06K 19/045; G06K 19/07705; H04W 4/80; H04W 12/06
USPC .............. 235/492, 487, 383, 462.45, 472.02
See application file for complete search history.

(56) References Cited

U.S. PATENT DOCUMENTS

| 7,270,276 | B2 | 9/2007 | Vayssiere | |
|---|---|---|---|---|
| 8,116,678 | B2 | 2/2012 | Johnson, Jr. et al. | |
| 8,788,418 | B2 * | 7/2014 | Spodak | G06Q 20/105 705/41 |
| 9,152,912 | B2 | 10/2015 | Lee | |
| 10,417,626 | B1 * | 9/2019 | Locke | G06Q 20/401 |
| 11,354,555 | B1 * | 6/2022 | Yee | G06K 19/07707 |
| 2006/0208092 | A1 * | 9/2006 | Winkler | G11C 16/349 235/492 |
| 2009/0159712 | A1 * | 6/2009 | Mullen | G06Q 20/3415 235/493 |
| 2014/0183269 | A1 * | 7/2014 | Glaser | G06V 40/45 235/492 |
| 2017/0109620 | A1 * | 4/2017 | Wurmfeld | G06K 19/07722 |
| 2018/0262062 | A1 * | 9/2018 | Kato | H02J 50/60 |
| 2019/0303917 | A1 * | 10/2019 | Locke | G06Q 20/405 |

OTHER PUBLICATIONS

Bhattacharyya et al., "An Ultra-Low-Power RFID/NFC Frontend IC Using 0.18 μm CMOS Technology for Passive Tag Applications", Sensors 2018, 18 (1452), 30 pages.
Author Unknown, "High performance HF reader / NFC initiator for payment applications with 1 W output power", Life Augmented, DS11794 Rev 6, Aug. 2018, 133 pages.
Shenzhen Normand Electronic Co.,Ltd "Integrated Light Source Intelligent Control of Chip-On-Top SMD Type LED", www. normandled.com [online], Jul. 22, 2015, 12 pages.

* cited by examiner

*Primary Examiner* — Daniel St Cyr
(74) *Attorney, Agent, or Firm* — KDW Firm PLLC

(57) ABSTRACT

Embodiments may be generally directed to methods, techniques and devices to provide an indication by a contactless card based on a detection of an event.

19 Claims, 8 Drawing Sheets

US 12,073,273 B2

1

TECHNIQUES TO DETECT AND PROVIDE AN INDICATION OF AN EVENT ON A CONTACTLESS CARD

BACKGROUND

Contactless cards are used in millions of transactions a day all over the world. Today's contactless cards provide users a number of choices or interfaces that they may use to perform the transactions. For example, a typical contactless card includes at least three interfaces, such as a magstripe, Europay, Mastercard, Visa (EMV) chip, and a contactless interface. Of the three interfaces, the contactless interface has been underutilized compared to the other interfaces for any number of reasons. For example, users may find using the contactless interface confusing, or they may experience a higher number of failed transactions than when they use the other interfaces. One problem frequently experienced by users occurs when the user does not bring the contactless card close enough to a point-of-sale (POS) terminal to receive power to cause an exchange of data, and the transaction fails. In some instances, the user may bring the contactless card close enough to receive power but not close enough for the exchange of data to occur within the specifications for the contactless interface. Again the transaction may fail. In these instances, the user generally does not why the transaction fails and may become frustrated with the contactless interface experience.

SUMMARY

Embodiments may be generally directed to systems, devices, and techniques including a contactless card, including a substrate, an antenna embedded in the substrate, a light-emitting diode (LED) embedded on the substrate, and detection logic embedded in the substrate, the detection logic to couple the antenna with the LED. The detection logic is configured to receive power generated by a magnetic field interacting with the antenna, the magnetic field generated by a device to perform a short-range wireless communication with the contactless card cause the LED to light in response to a power level being above a threshold level required to perform the short-range wireless communication with the device.

Embodiments may be generally directed to system, devices, and techniques including a contactless card, including a light-emitting diode (LED), a chip comprising processing circuitry coupled with and the LED, and memory configured to store detection logic. In embodiments, the detection logic, when executed by the processing circuitry, to cause the processing circuitry to detect a short-range communication to read data from the memory, determine the short-range communication to read the data is complete, and cause the LED to light a first color in response to determining the short-range communication is complete.

Embodiments may be generally directed to systems, devices, and techniques including a computer-implemented method, including inductively coupling, by an antenna of a contactless card, with a second antenna of a device, detecting, by a processor of the contactless card, a near-field communication (NFC) read operation to read data from a memory coupled with the processor, the NFC read operation communicated via the antenna inductively coupled with the second antenna, and determining whether the NFC read operation to read the data is completed successfully or unsuccessfully. The method also includes lighting an LED a first color in response to determining the NFC read operation

2 is completed successfully, or lighting the LED a second color in response to determining the NFC read operation is completed unsuccessfully.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments discussed herein may be generally directed to systems, devices, circuitry, and techniques to provide an indication on a contactless card based on an occurrence of one or more events. Specifically, the contactless card includes detection logic configured to detect one or more events, and in response to a detected event, the detection logic causes a light-emitting diode (LED) to emit light, providing an indication of the event to a user.

As previously discussed, the contactless interface of a contactless card is typically underutilized compared to the other interfaces provided on the card. Embodiments discussed herein provide a user a better experience when performing a transaction with the contactless interface by provide an indication of one or more events during the transaction process. For example, the card may include the detection logic to determine when no power is detected, insufficient power is detected, whether a data exchange was successful or not, and so forth, and cause one an LED to light based on the detection.

In one specific example, the contactless card, including the detection logic, is configured to detect power received by the contactless card from another device, such as a point-of-sale (POS) terminal, via electromagnetic induction. In response to detecting the power provided to the contactless card, the detection logic causes an LED on the contactless card to emit light. The light may notify a user that the contactless card is receiving power from the POS terminal. In another example, the detection logic may be configured to detect when the received power is above a threshold level, e.g., a power level required to perform a contactless interface exchange, and cause the LED to light.

In some instances, when the power level is detected but below the threshold level, the detection logic may cause the LED to light a color. However, when the power level is above the threshold level, the detection logic may cause the LED to light a different color. Thus, the detection logic and LED may provide an indication to a user when power is received by insufficient. The user, based on the indication, may bring the contactless card closer to a POS terminal to receive more power resulting in the power level going above the threshold value and causing the LED to provide an indication that sufficient power is now being supplied. A successful communication exchange between the contactless card and the POS terminal may then occur.

The detection logic may also be configured to provide an indication via the LED based on other events. For example, the detection logic may cause the LED to light a color when data is provided to a POS terminal based on a request for data to perform a transaction. These and other details will become more apparent in the following description.

Figure 1:
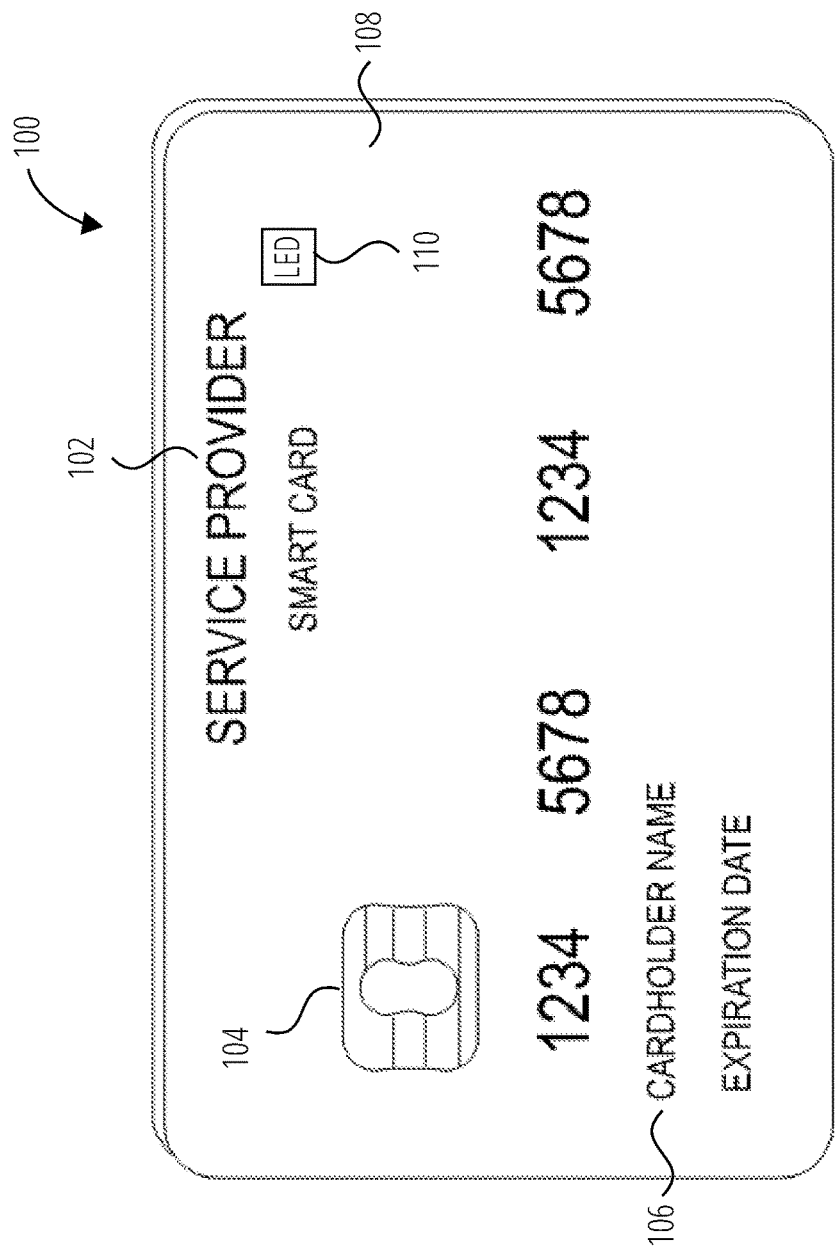
FIG. 1 illustrates a contactless card 100 in accordance with one embodiment.

FIG. 1 illustrates an example configuration of a contactless card 100, which may include a transaction card, a payment card, such as a credit card, debit card, or gift card. The contactless card 100 may be issued by a service provider as displayed as service provider indicia 102 on the front or back of the contactless card 100. In some examples, the contactless card 100 is not related to a payment card, and may include, without limitation, an identification card or an access card. In some examples, the contactless card 100 may include a dual interface contactless payment card, a rewards card, and so forth.

The contactless card 100 may include a substrate 108, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In embodiments, components of the contactless card 100, such as the antenna, front end circuitry, chip, detection logic, light-emitting diode (LED), etc., may be embedded in and/or on one or more layers of the substrate. In some examples, the contactless card 100 may have physical characteristics compliant with the ID-1 format of the ISO/IEC 7816 standard, and the contactless card 100 may otherwise be compliant with the ISO/IEC 14443 standard. However, it is understood that the contactless card 100, according to the present disclosure, may have different characteristics, and the present disclosure does not require a transaction card to be implemented in a payment card.

The contactless card 100 may also include identification information 106, such as a cardholder's name, account number, expiration date, etc., displayed on the front and/or back of the card, and a contact pad 104. The contact pad 104 may include one or more pads and be configured to establish contact with another client device, such as an ATM, a point-of-sale (POS) terminal, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 100 may also include a chip having processing circuitry, an antenna, and other components, as will be discussed in further detail below. These components may be located behind the contact pad 104 or elsewhere on or in the substrate 108, e.g., within a different layer of the substrate 108, and may electrically and physically be coupled with the contact pad 104. The contactless card 100 may also include a magnetic strip or tape, which may be located on the back of the card (not shown in FIG. 1).

The contactless card 100 may also include a short-range communication device, such as a Near-Field Communication (NFC) device, a Bluetooth® device, and so forth, coupled with an antenna capable of communicating via a corresponding short-range communication protocol, e.g., the NFC protocol or Bluetooth® protocol. The contactless card may be an unpowered device and configured to operate on power supplied by another device, such as an NFC device, a POS terminal, a mobile phone device, a mobile device, an ATM, etc. In some instances, a short-range communication exchange may require a separation of 10 centimeters (cms) or less to power the contactless card 100 and exchange data.

As will be discussed in more detail below, embodiments include providing one or more light-emitting diodes 110 (LED) that may be embedded on and/or in the substrate 108 of the contactless card 100. The LED may be any type of LED. For example, the LED may be a surface-mounted LED physically and electrically coupled with the circuitry of the contactless card 100, such as the detection logic, the chip, the antenna, etc. In one example, the contactless card may include one or more traces or interconnects embedded within a layer of the substrate 108 to coupled the LED with other components of the contactless card. In one configuration, the LED may be a simple LED configured to light one color and to indicate one event, such as the contactless card 100 coming within the proper range to perform an NFC communication with a specified period of time, the NFC communication is complete, the NFC communication failed, etc.

In other instances, the light-emitting diode 110 may be a bi-color LED, a tri-color LED, a multi-color LED, etc., and may be configured to light different colors based on different events. For example, the light-emitting diode 110 may be configured to light a first color to indicate that power is being received from another device, a second color to indicate sufficient power is provided to conduct an NFC communication, and a third color to indicate that the NFC communication is complete, and so forth. In another example, the light-emitting diode 110 may be configured to light a first color based on a successful completion of an NFC communication and a second color based on an unsuccessful completion of the NFC communication. The LED may be configured to light any number of colors based on any number of events, and embodiments are not limited to these examples.

Figure 2A:
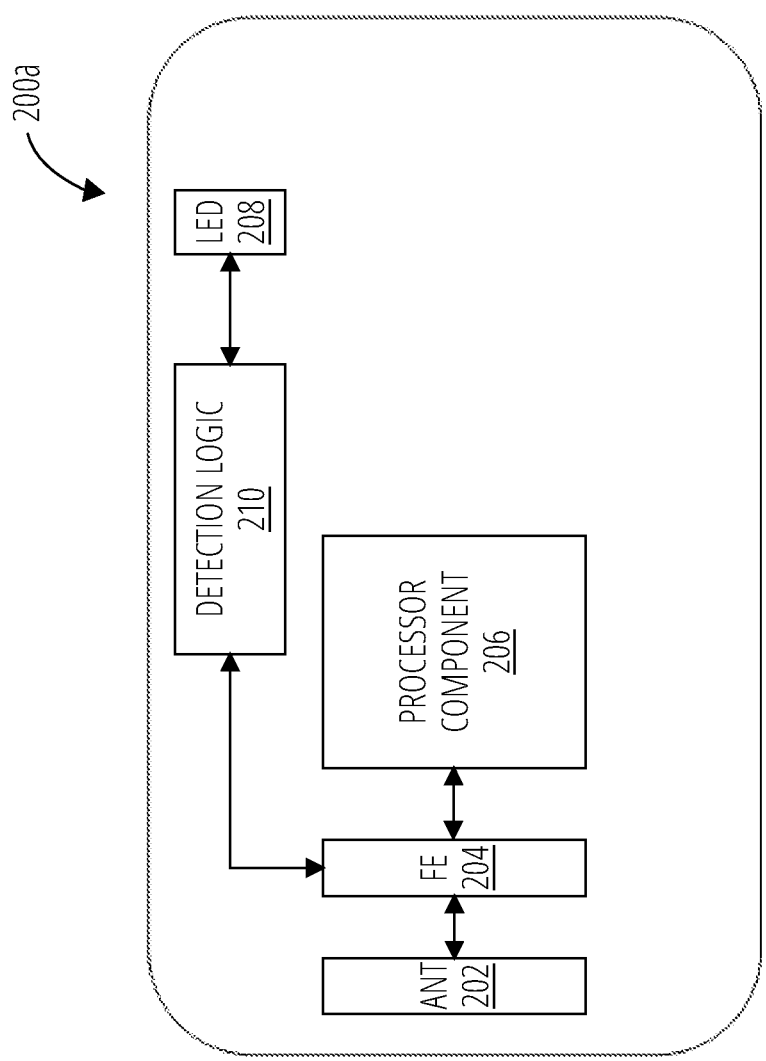
FIG. 2A illustrates an example of components of a contactless card 200a in accordance with embodiments.

FIG. 2A illustrates an example configuration of components of contactless card 200a configured to perform operations discussed herein. In the illustrated embodiment, the contactless card 200a includes an antenna 202, front end circuitry 204, a processor component 206, an LED 208, and detection logic 210. In the illustrated example of FIG. 2A, the detection logic 210 is implemented as a standalone or separate component than the processor component 206. As will be discussed in FIG. 2B, at least a portion of the detection logic 210 may be implemented in the processor component 206. The components may be physically and/or electrically coupled to each other via one or more traces, interconnects, and/or wired connections that may be embedded within or on one or more layers of the contactless card 200a.

The antenna 202 may be any type of antenna and may be designed to operate based on a short-range communication protocol. For example, the antenna 202 may be configured to operate as a loop-inductor antenna configured to couple with another device's antenna and excite or generate current based on the other device inducing a magnetic field. For NFC communications, the other device may excite current through its antenna at 13.56 Megahertz (MHz), which may generate a current through the antenna 202 based on inductance coupling between the two antennas. The current generated on the contactless card 200a via antenna 202 may be used to power the components, including the processor component 206, and detection logic 210 to perform operations, such as conducting one or more NFC communications. In some embodiments, the antenna 202 may be configured to operate in accordance with another short-range communication protocol, such as RFID at the 13.56 Mhz frequency, or a different frequency, such as 2.4 Gigahertz (GHz) for Bluetooth® low energy communications (BLE).

In embodiments, the antenna 202 may be coupled to front end circuitry 204, which includes circuitry to convert the analog signal into a digital signal and provide power to other components of the contactless card 200a. Moreover, the front-end circuitry 204 includes components such as a phase and amplitude detector, an analog/digital (A/D) converter, oscillators, regulators, and other logic to perform the A/D functionality and provide power.

The front end circuitry 204 may also include one or more interfaces to physically couple with other components of the contactless card 200a, including the processor component 206 and the detection logic 210. Specifically, the front end circuitry 204 may include one or more voltage outputs to provide power to the processor component 206 and the detection logic 210 and a serial interface used to communicate data to the processor component 206. In one example, the power provided by the front end circuitry 204 may be in the range of 1.65-5.5 Volts (V) or 2.4-5.5V. In some instances, the front end circuitry 204 may be implemented in an integrated circuit or microcontroller, e.g., the components may be implemented in a single piece of silicon or die. However, in other instances, the front end circuitry 204 may include individual components and/or be implemented in the processor component 206 itself.

In the illustrated example, the front end circuitry 204 is coupled with detection logic 210 via one or more traces or interconnects to provide power to the detection logic 210. The detection logic 210 may include circuitry to detect a power level generated by the antenna 202. In the simplest configuration, the detection logic 210 may be a trace or interconnect connecting directly to the LED 208. In this example, the LED 208 will light when there is sufficient power (voltage/current) to drive the LED 208. In this example, the contactless card 200a may indicate when a minimal amount of power is being provided.

Typically, the amount of power to drive the LED 208 is not enough to sufficiently power the other components of the contactless card 200a, including the processor component 206, while operating in accordance with the short-range communication protocols and standards. The processor component 206 may require a power level above a threshold level to operate in accordance with one or more NFC standards or protocols, for example. In one specific example, the ISO 14443 standard may require that an NFC communication must within a specified time period, such as 500 milliseconds (ms). The processor component 206 may be designed and configured to meet the standards specified by the NFC protocols and standards when a threshold level (threshold power level) is met, such as 6 milliwatts (mW).

As discussed above, a user may want to know when the contactless card is sufficiently close enough to the reader device to sufficiently power the components to perform a successful communication. The detection logic 210 may be configured such that it causes the LED 208 to light when the threshold level of power for the processor component 206 is met. For example, the detection logic 210 may include circuitry such as a resistor having a resistance selected to cause the LED 208 to light when the power requirements for the processor component 206 are met and to sufficiently meet the short-range protocols and standards. The resistance of the resistor may be selected based on the specifications of the LED 208 and the processor component 206. The LED 208 requirements may include a specific or a range of voltage(s) and specific or range of current to light. Moreover, the resistance of the resistor may be selected such that the specifications to light the LED 208 are met when the threshold power (voltage and current) requirements of the processor component 206 are met, e.g., those specified to perform NFC or BLE operations.

In some instances, the LED 208 may be a bi-color or a multi-color LED, and the detection logic 210 may include circuitry configured to light the LED 208 in different colors based on different events. For example, the detection logic 210 may be configured to light the LED 208 a first color based on detecting a first event, e.g., power is detected, and a second color based on detecting a second event, e.g., the detected power is greater (or equal) to a threshold level to perform the NFC or BLE operations. In one example, a bi-color LED 208 may be configured to light a first color based on the flow of current in one direction and a second color based on the flow of current in the opposite direction. In this example, the detection logic 210 may include switching circuitry configured to switch the flow of current to provide the current in a first direction to LED 208 to cause the first color to light and then to switch the current direction when the threshold level is met to light the LED 208 in the second color. Note that embodiments are not limited to this specific design and may be adjusted based on the requirements and configuration of the LED 208 to light in different colors.

In the illustrated example configuration in FIG. 2A, the detection logic 210 is coupled directly to the front end circuitry 204. In some instances, the detection logic 210 may be coupled directly to the antenna 202 and may receive current directly from the antenna 202 when it is be excited by another device's magnetic field. Embodiments are not limited to the illustrated configuration. Moreover, in some instances, at least a portion of the detection logic 210 may be implemented on the processor component 206, as illustrated in FIG. 2B.

Figure 2B:
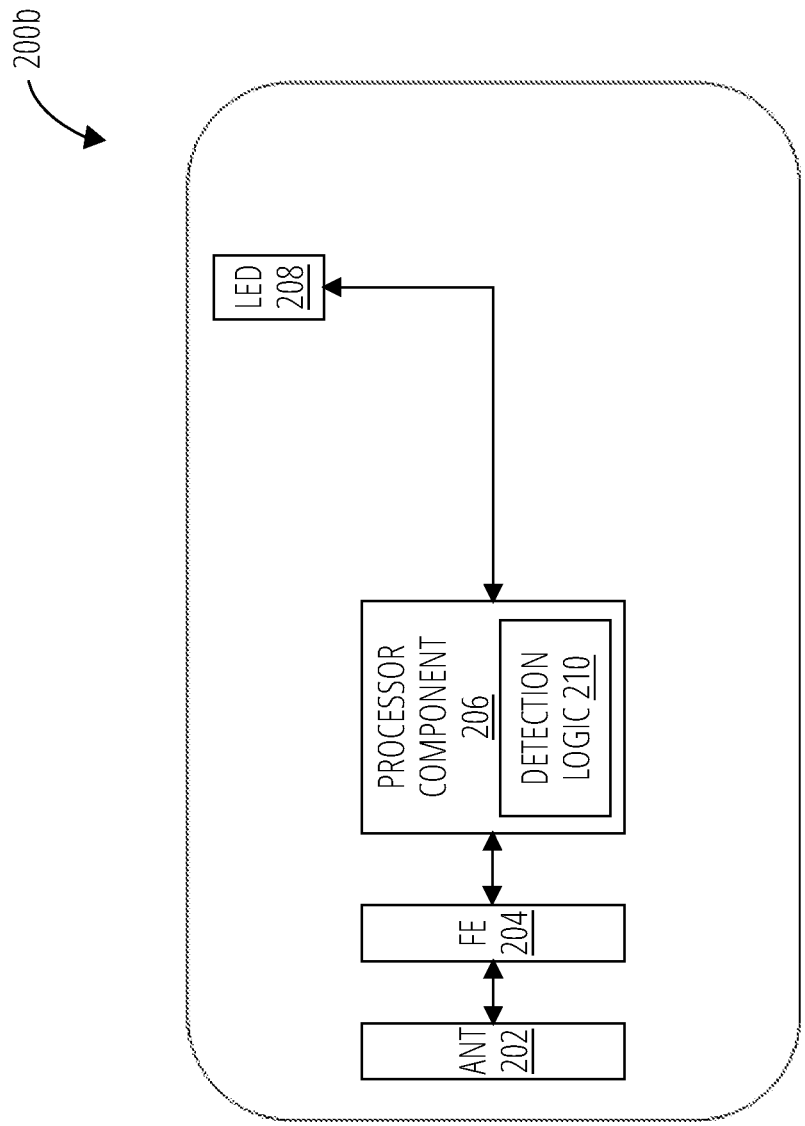
FIG. 2B illustrates another example of components of a contactless card 200b in accordance with embodiments.

FIG. 2B illustrates an example configuration of the contactless card 200b including at least a portion of the detection logic 210 implemented on the processor component 206. In some instances, the detection logic 210 may be implemented as hardware circuitry on the same die as the processor component 206. In some instances, at least a portion of the detection logic 210 may be implemented as one or more instructions programmed and stored in the memory of the processor component 206. The instructions may be implemented in a Java®-based programming language, such as Java® Card. Embodiments are not limited to this example, and the instructions may be implemented in a different language, such as a proprietary card language, MULTOS® complied into MEL (Multos Elementary Language) bytecode, or Windows® for Smart Cards (Visual Basic).

In embodiments, the detection logic 210 may be programmed to perform operations similar to those discussed above in FIG. 2A. For example, the detection logic 210 may be programmed to determine a power level provided via the antenna 202, and to cause the LED 208 to light when power is detected and/or when power is detected above a threshold level. For example, the processor component 206 may be coupled via one or more interconnects or traces with the LED 208, and output power to drive the LED 208 to light a color based on power being detected by the detection logic 210. In another example, the detection logic 210 may be configured with a threshold level, and may be configured to output power to drive the LED 208 when the power detected is above the threshold level. The threshold level may be preset at the time of manufacture or may be programmed by a user or administrator of the contactless card.

In some instances, the detection logic 210 may be configured to cause the LED 208 to light different colors based on different detected events. In a third example, the processor component 206 may be coupled to LED 208, and the detection logic 210 may be configured to output power on a first interconnect to drive the LED 208 to light a first color when a minimal amount of power is detected (or an amount of power below the threshold level), and to output power on a second interconnect to drive LED 208 to light second color when the amount of power detected is above the threshold level. Embodiments are not limited in this manner, and the processor component 206 may be coupled to any number of ways based on the requirements of the LED 208, e.g., the number of connections/interconnects, and the requirements to drive the LED.

In embodiments, the detection logic 210 may be programmed to light the LED 208 a color based on a detection of another event, such as a completion of an NFC communication exchange. For example, the detection logic 210 may be configured to cause the LED 208 to light when data read from the card or is attempted to be read from the card. In some instances, the detection logic 210 may be configured to light the LED 208 a first color when the attempt to read the data from the card was successful and another color when the attempt to read the data was unsuccessful. The detection logic 210 may make a determination as to whether the read was successfully provided or not, based on data received from another applet. The other applet may be configured to provide an indication to the detection logic 210 indicating whether the read operation was completed within a specified time or not. If the read was completed within the time, the detection logic 210 may determine the read operation was successful and indicate as such by lighting the LED 208 a color. Similarly, if the read was not completed within the specified time, the detection logic 210 may determine the read operation failed and indicate it as such. In some instances, the NFC read may be part of an NFC exchange and for data to perform a transaction, e.g., to purchase a good or service, and the detection logic 210 may be configured to light LED 208 a color based on a successful performance of the NFC read and/or NFC exchange to indicate that the data to perform the transaction was provided. Embodiments are not limited to these examples. In another example, the reading device may provide an indication that may be interpreted by the detection logic 210 to determine whether the data was provided successfully or not. The indication may be data provided to the card. In one simple example, the data may be one bit indicating whether the read was performed successfully or not, e.g., a one indicates a successful read and a zero indicates an unsuccessful read, or vice versa.

The detection logic 210 may be configured to light the LED 208 a number of colors based on a number of events. The detection logic 210 may communicate one or more signals to the LED 208 to light the LED 208 a specific color. The signals may be communicated and/or provided based on the specifications and requirements of the LED 208. For example, the LED 208 may require current to be driven to a first interconnect of the LED 208 to light it a first color and a second interconnect of the LED 208 to light it a second color. In some instances, the LED 208 may include circuitry and/or controller, that lights the LED 208 a certain color based on a specified signal provided by the detection logic 210. The detection logic 210 may be programmed to output a signal based on the requirements of the LED 208 to cause a specified color based on the desired indication.

Figure 3:
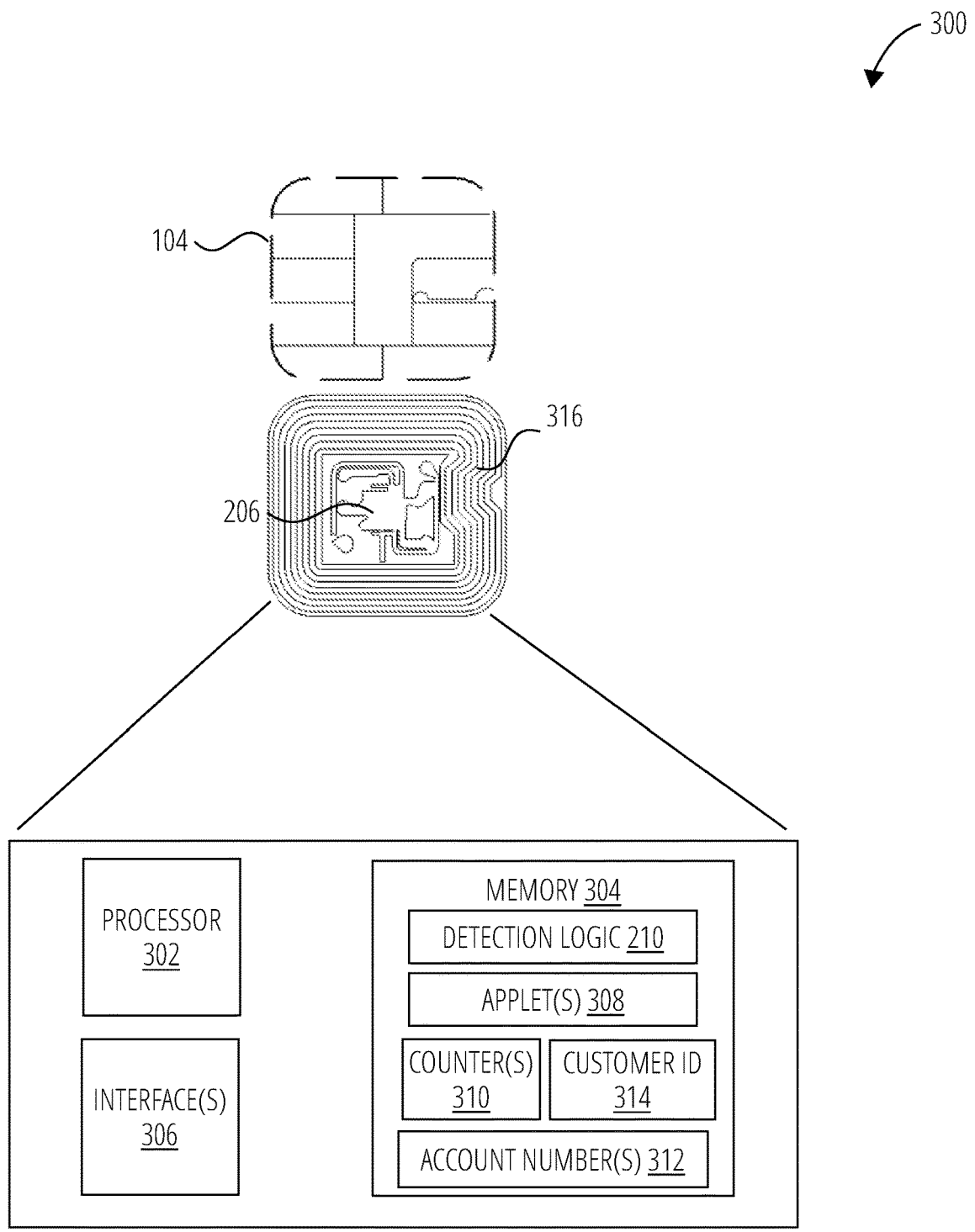
FIG. 3 illustrates a contactless card component 300 in accordance with embodiments.

FIG. 3 illustrates the components of the contact pad 104 and the processor component 206 of the contactless card 100, 200a, and 200b. As illustrated in FIG. 3, the contact pad 104 of contactless card 100 may include the processor component 206 for storing, processing, and communicating information, including a processor 302, a memory 304, and one or more interface(s) 306. It is understood that the processor component 206 may contain additional components, including additional processors, memories, error and parity/CRC checkers, data encoders, anticollision algorithms, controllers, command decoders, security primitives and tamperproofing hardware, as necessary to perform the functions described herein.

The memory 304 may be a read-only memory, write-once read-multiple memory or read/write memory, e.g., RAM, ROM, and EEPROM, and the contactless card 100 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 304 may be encrypted memory utilizing an encryption algorithm executed by the processor 302 to encrypted data.

The memory 304 may be configured to store, the detection logic 210, one or more applet(s) 308, one or more counter(s) 310, a customer identifier 314, and the account number(s) 312, which may be virtual account numbers. As discussed above in FIG. 2B, the detection logic 210 may be configured to light an LED 208 coupled with the processor component 206 via one or more leads, traces, interfaces, etc., a number of colors based on detected events performed with the contactless card. The one or more applet(s) 308 may comprise one or more software applications configured to execute on one or more contactless card applets, such as a Java® Card applet. However, it is understood that applet(s) 308 are not limited to Java Card applets, and instead may be any software application operable on contactless cards or other devices having limited memory. The one or more counter(s) 310 may comprise a numeric counter sufficient to store an integer. The customer identifier 314 may comprise a unique alphanumeric identifier assigned to a user of the contactless card 100, and the identifier may distinguish the user of the contactless card from other contactless card users. In some examples, the customer identifier 314 may identify both a customer and an account assigned to that customer and may further identify the contactless card 100 associated with the customer's account. As stated, the account number(s) 312 may include thousands of one-time use virtual account numbers associated with the contactless card 100. An applet(s) 308 of the contactless card 100 may be configured to manage the account number(s) 312 (e.g., to select an account number(s) 312, mark the selected account number(s) 312 as used, and transmit the account number(s) 312 to a mobile device for autofilling by an autofilling service.

The processor 302 and memory elements of the foregoing exemplary embodiments are described with reference to the contact pad 104, but the present disclosure is not limited thereto. It is understood that these elements may be implemented outside of the contact pad 104 or entirely separate from it, or as further elements in addition to processor 302 and memory 304 elements located within the contact pad 104.

In some examples, the contactless card 100 may comprise one or more antenna(s) 316. The one or more antenna(s) 316 may be placed within the contactless card 100 and around the processor component 206 of the contact pad 104. For example, the one or more antenna(s) 316 may be integral with the processor component 206 and the one or more antenna(s) 316 may be used with an external booster coil. As another example, the one or more antenna(s) 316 may be external to the contact pad 104 and the processor component 206.

As previously mentioned, the coil of contactless card 100 may act as the secondary of an air core transformer. The terminal may communicate with the contactless card 100 by performing power or amplitude modulation. The contactless card 101 may infer the data transmitted from the terminal using the gaps in the contactless card's power connection, which may be functionally maintained through one or more capacitors. The contactless card 100 may communicate back by switching a load on the contactless card's coil or load modulation. Load modulation may be detected in the terminal's coil through interference. More generally, using the antenna(s) 316, processor 302, and/or the memory 304, the contactless card 101 provides a communications interface to communicate via NFC, Bluetooth, and/or Wi-Fi communications.

As explained above, contactless card 100 may be built on a software platform operable on smart cards or other devices having limited memory, such as JavaCard®, and one or more or more applications or applets may be securely executed including the detection logic 210. Applet(s) 308 may be added to contactless cards to provide a one-time password (OTP) for multifactor authentication (MFA) in various mobile application-based use cases. Applet(s) 308 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 308 may be configured to encode the OTP as an NDEF type 4 well known type text tag. In some examples, NDEF messages may comprise one or more records. The applet(s) 308 may be configured to add one or more static tag records in addition to the OTP record.

In some examples, the one or more applet(s) 308 may be configured to emulate an RFID tag. The RFID tag may include one or more polymorphic tags. In some examples, each time the tag is read, different cryptographic data is presented that may indicate the authenticity of the contactless card. Based on the one or more applet(s) 308, an NFC read of the tag may be processed, the data may be transmitted to a server, such as a server of a banking system, and the data may be validated at the server.

In some examples, the contactless card 100 and a server may include certain data such that the card may be properly identified. The contactless card 100 may include one or more unique identifiers (not pictured). Each time a read operation takes place, the counter(s) 310 may be configured to increment. In some examples, each time data from the contactless card 100 is read (e.g., by a mobile device), the counter(s) 310 is transmitted to the server for validation and determines whether the counter(s) 310 are equal (as part of the validation) to a counter of the server.

The one or more counter(s) 310 may be configured to prevent a replay attack. For example, if a cryptogram has been obtained and replayed, that cryptogram is immediately rejected if the counter(s) 310 has been read or used or otherwise passed over. If the counter(s) 310 has not been used, it may be replayed. In some examples, the counter that is incremented on the card is different from the counter that is incremented for transactions. The contactless card 101 is unable to determine the application transaction counter(s) 310 since there is no communication between applet(s) 308 on the contactless card 100.

In some examples, the counter(s) 310 may get out of sync. In some examples, to account for accidental reads that initiate transactions, such as reading at an angle, the counter(s) 310 may increment but the application does not process the counter(s) 310. In some examples, when the mobile device is woken up, NFC may be enabled and the device may be configured to read available tags, but no action is taken responsive to the reads.

To keep the counter(s) 310 in sync, an application, such as a background application, may be executed that would be configured to detect when the mobile device wakes up and synchronize with the server of a banking system indicating that a read that occurred due to detection to then move the counter forward. In other examples, Hashed One Time Password may be utilized such that a window of mis-synchronization may be accepted. For example, if within a threshold of 10, the counter(s) 310 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 310 increases in the appropriate sequence, then it possible to know that the user has done so.

A key diversification technique utilizing the counter(s) 310, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 100, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 100. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 4A:
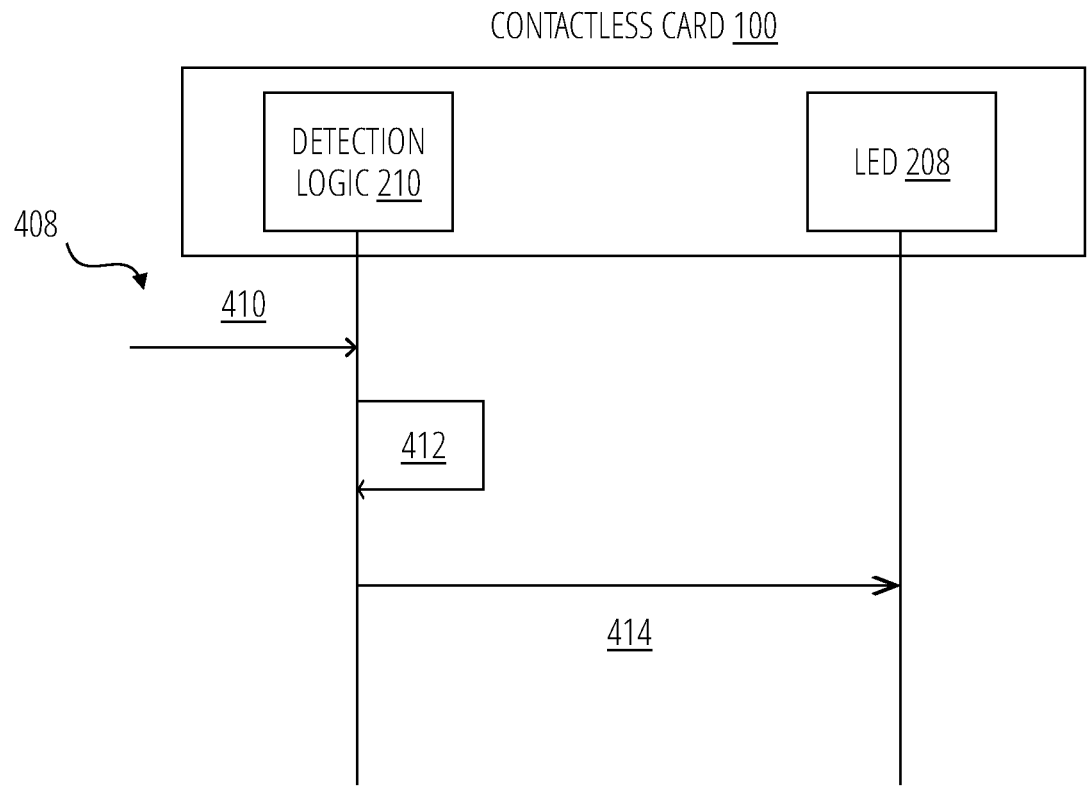
FIG. 4A illustrates a processing flow 408 in accordance with embodiments.

FIG. 4A illustrates a general processing flow 408 that may be performed by components of a contactless card 100 to process an event and provide an indication to a user. In embodiments, the detection logic 210 receives and/or detects an event at line 410. As previously discussed, the event may be detected power, power below a threshold level, power above (or equal) to the threshold level, data provided successfully or unsuccessfully, etc. In one example, the detection logic 210 may be circuitry separate from processor component 206, as illustrated in FIG. 2A, and configured to receive the event. In another example, the detection logic 210 may be software and/or logic stored the memory of the processor component 206, as illustrated in FIG. 2B, and configured to receive the event.

At line 412, the detection logic 210 may process the event. For example, circuitry of the detection logic 210 may operate based on the design of the circuit, e.g., cause the LED 208 to light when power is received and/or when power is above the threshold level. If the detection logic 210 is more complex hardware and/or software, the detection logic 210 may process information received from other software or logic operating on the processor component 206. As mentioned, the processor component 206 may include functions and/or applets that provide an indication of a power level, an indication of a read exchange, and so forth, to the detection logic 210.

Figure 5:
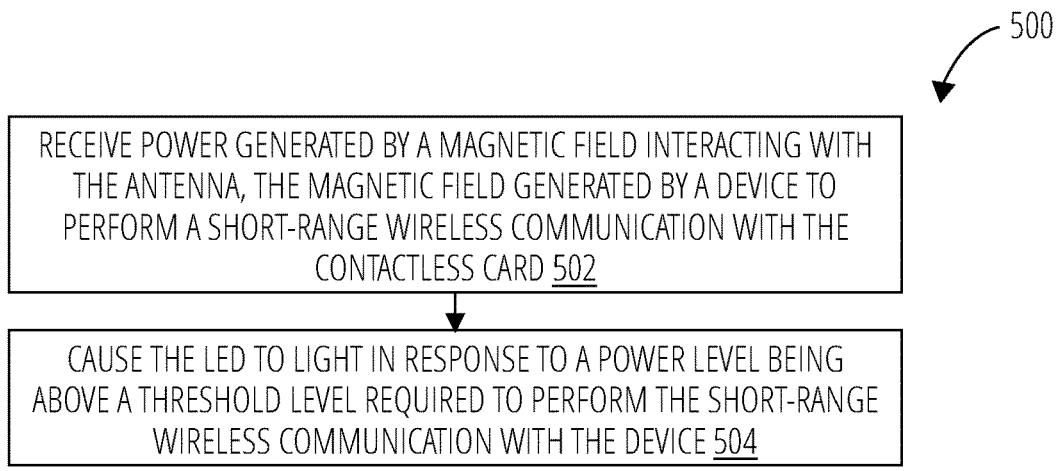
FIG. 5 illustrates a routine 500 in accordance with embodiments.
Figure 6:
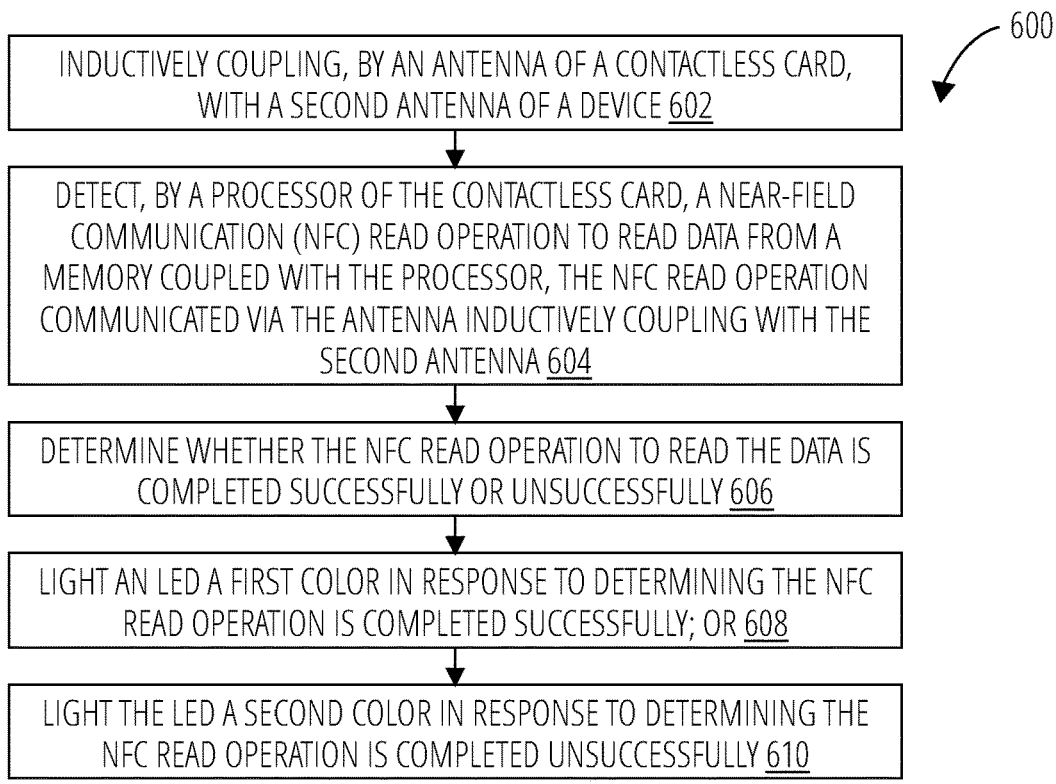
FIG. 6 illustrates a routine 600 in accordance with embodiments.

At 414, the detection logic 210 may provide the indication by lighting the LED 208. As discussed, the LED 208 may be lit in any number of ways based on the operating characteristics of the LED 208. FIGS. 4A, 5, and 6 illustrate specific routines that may be performed by a contactless card 100 and/or detection logic 210.

Figure 4B:
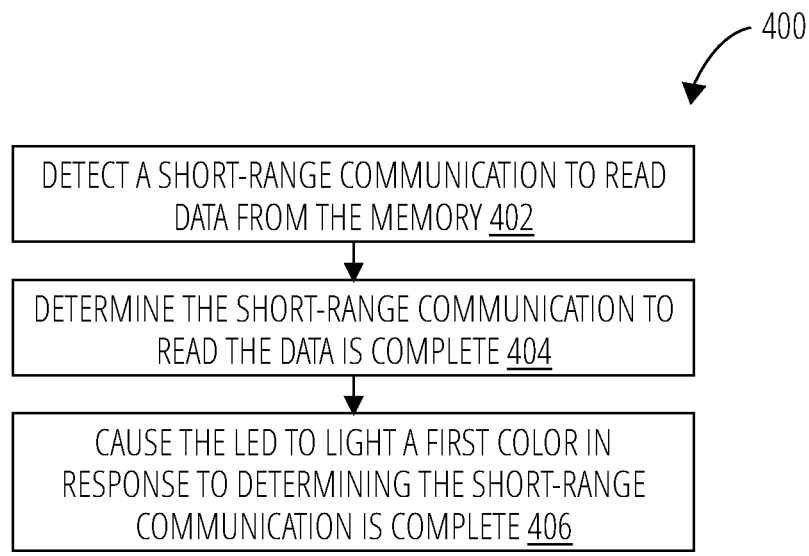
FIG. 4B illustrates a routine 400 in accordance with embodiments.

FIG. 4B illustrates an example routine 400 that may be performed by detection circuitry or logic, such as detection logic 210 of a contactless card, to indicate that an attempt to read data is complete. In routine 400, the detection logic may be programmed and/or include logic that may be processed by processing circuitry of a chip or processor embedded in the contactless card.

At block 402, the routine 400 includes detecting a short-range communication to read data from memory of the contactless card. For example, the detection logic may receive data from another applet indicating that another device is attempting to read data from the memory of the contactless card. The short-range communication may be an NFC communication, a Bluetooth communication, a ZigBee communication, a WiFi communication, etc., and include instructions that are processed by the applet to read the data. In one example, the data may include transaction information for a POS terminal to perform a transaction. Other data may include identification data, authentication data, etc. Embodiments are not limited in this manner.

At block 404, the routine 400 includes determining the short-range communication to read the data is complete. For example, the applet to process the read operation may send an indication to the detection logic. In the simplest form, the indication may be a single bit sent to the detection logic. In another example, the indication may be a Java Card based instruction or call to the detection logic or function. In some instances, the indication may indicate whether the read operation was completed successfully or not, e.g., the data was provided to the reader within a specified time or not.

At block 406, the routine 400 includes causing the LED to light in response to determining the short-range communication is complete. For example, detection logic may send a signal to the LED to light it green or any other color. However, embodiments are not limited in this manner. In some instances, the detection logic may determine whether the data was provided successfully or not and cause the LED to light. In one example, the detection logic may light the LED when the data was provided successfully and not light the LED when the data was not provided successfully. In another example, the detection logic may light the LED a first color when the data was provided successfully and a different color when the data was not provided successfully.

FIG. 5 illustrates an example routine 500 that may be performed by detection circuitry or logic, such as detection logic 210 of a contactless card to detect a power level generated by an antenna interacting with a magnetic field, and cause an LED to light based on the detection. At block 502, the routine 500 includes receiving power generated by a magnetic field interacting with the antenna of the contactless card. The power includes a current at voltage level based on the strength of a magnetic field generated by another device. The other device may be a short-range communication device configured to interact with the contactless card. In embodiments, the short-range communication device may excite its own antenna to generate the magnetic-field and perform modulation to perform a short-range wireless communication with the contactless card. The detection logic may receive the power directly from the antenna or from a front end circuitry 204 component of the contactless card.

At block 504, the routine 500 includes causing an LED to light in response to a power level being above a threshold level required to perform the short-range wireless communication with the device. As discussed, the threshold level may be determined and based on the requirements of the processor to perform the short-range communication in accordance with the short-range communication's protocols, standards, specifications, and requirements. For example, if the short-range communication requires that a communication exchange between the contactless card and another occurs within a specified time period, the chip may be designed to perform the exchange to meet the standard at a specified power level. In this example, the specified power level may be the threshold level. The detection logic may be configured with the threshold level. In one example, the detection logic includes a resistor having a resistance to cause the LED to light at the threshold level. However, as discussed above, the detection logic may include additional circuitry, including switching circuitry configured to light the LED a first color when the power is below the threshold level, and a second level when the power is above the threshold level. Embodiments are not limited in this manner.

FIG. 6 illustrates an example routine 600 that may be performed by components of a contactless card including an antenna, an LED, and detection circuitry or logic, such as detection logic 210. In embodiments, the routine 600 may be performed to provide an indication, via an LED, to a user based upon the detection of an event, such as whether power is detected by the contactless card and/or sufficient power is provided to perform an NFC communication on the contactless card.

At block 602, the routine 600 includes inductively coupling, by an antenna of a contactless card, with a second antenna of a device. For example, the antenna of the contactless card may be energized or react to the antenna of an NFC device actively generating a radio frequency field at the 13.56 MHz on ISO/IEC 18000-3 air interface.

At block 604, the routine 600 includes detecting a near-field communication (NFC) read operation to read data from a memory, the NFC read operation communicated via the antenna inductively coupled with the second antenna. For example, the contactless card including the antenna may receive one or more bits of data from an NFC device based on the device modulating the incident field or magnetic field. In one example, the NFC device may be part of a point-of-sale (POS) terminal to perform transactions for goods and services and the NFC read operation may be part of an exchange to perform a transaction. In embodiments, the chip or processor of the contactless card may include an applet, as discussed, configured to process the data including the NFC read operation received from the device. For example, the contactless card may include an applet configured to generate a response to the NFC read operation, e.g., an NFC response. The processor of the contactless card may determine requested data from the memory, generate a response NFC message, and cause the NFC response to be communicated to the NFC device. Other operations may be performed by the processor based on the information and data received from the NFC device and embodiments are not limited in this manner.

At block 606, the routine 600 includes determining whether the NFC read operation to read the data is completed successfully or unsuccessfully. For example, the applet configured to respond to the NFC read operation may generate an indication indicating whether the information requested was successfully communicated to the NFC device or not. The indication may be provided to the detection logic. At block 608, the routine 600 includes lighting an LED a first color in response to determining the NFC read operation is completed successfully; or at block 610, the routine 600 includes lighting the LED a second color in response to determining the NFC read operation is completed unsuccessfully. The detection logic may send one or more signals to an LED to light the LED a color based on whether the NFC operation was completed successfully or not. For example, the detection logic may light the LED green when the operation was completed successfully and red when the operation was not successful. The LED may be a bicolored or multicolored LED. In other instances, the contactless card may include more than one LED, e.g., a red LED and a green LED. The detection logic may communicate one or more signals to the appropriate LED, e.g., to cause the green LED to light when the NFC read was successful or cause the red LED to light when the NFC read was unsuccessful. Embodiments are not limited in this manner.

In embodiments, the detection logic may be configured to light an LED based on one or more other events. For example, the detection logic may include instructions to determine a power level supplied to the processor configured to perform the NFC operations. In one example, the detection logic may be configured to determine the power supplied to the contactless card via one or more low level instructions that may gather operating characteristics from an operating system of the contactless card. Note that the operating system may be a basic operating system or controller software and include a set of instructions to control and monitor the hardware of the contactless card, e.g., the memory, processing circuitry, interfaces, etc. Based on the determine power level, the detection logic may communicate a signal to light the LED.

Figure 7:
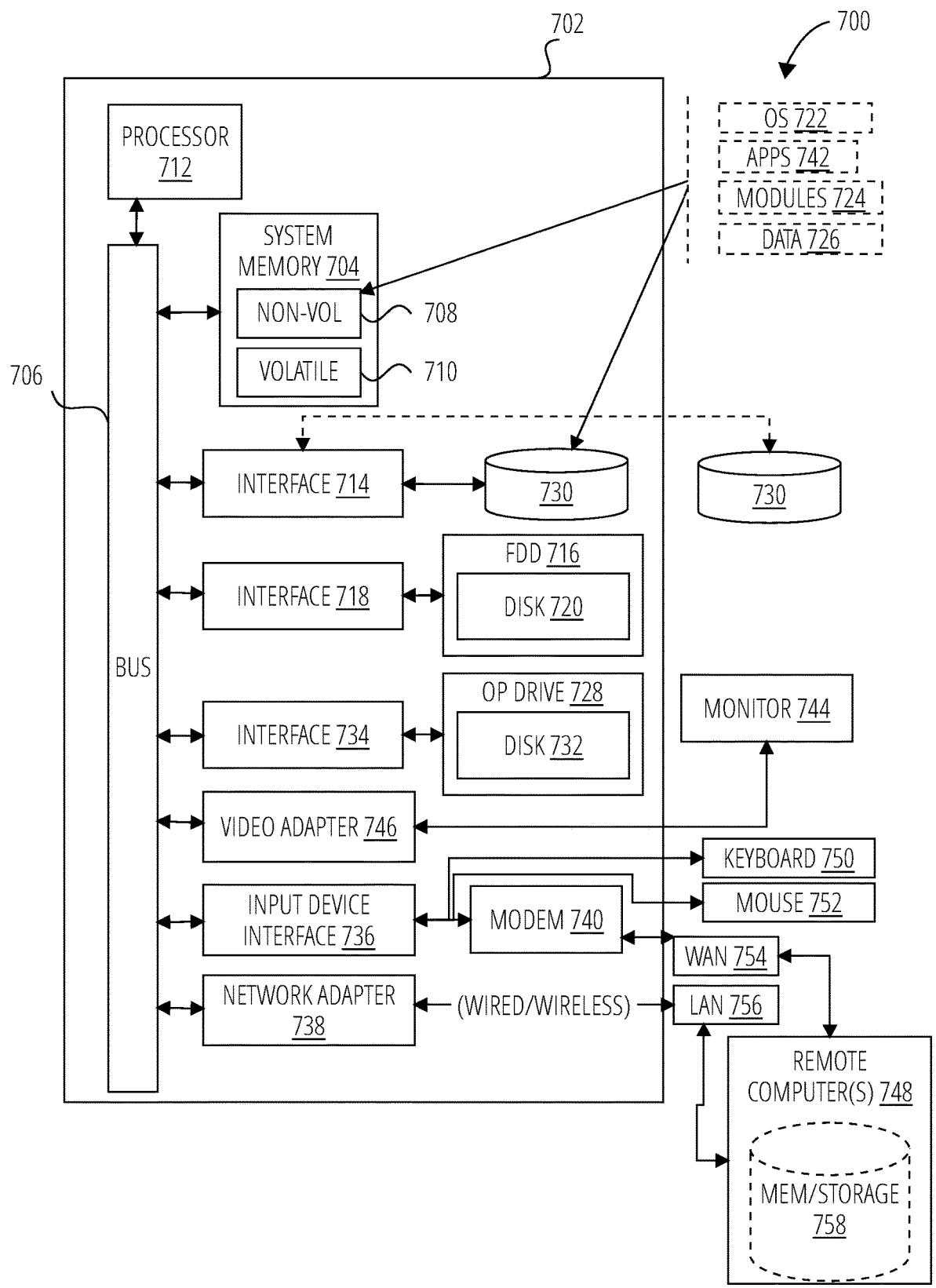
FIG. 7 illustrates a computer architecture 700 in accordance with one embodiment.

FIG. 7 illustrates an embodiment of an exemplary computer architecture 700 suitable for implementing various embodiments as previously described. In one embodiment, the computer architecture 700 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processor 712, a system memory 704 and a system bus 706. The processor 712 can be any of various commercially available processors.

The system bus 706 provides an interface for system components including, but not limited to, the system memory 704 to the processor 712. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile 708 and/or volatile 710. A basic input/output system (BIOS) can be stored in the non-volatile 708.

The computer 702 may include various types of computer-readable storage media in the form of one or more lower speed memory units, including an internal (or external) hard disk drive 730, a magnetic disk drive 716 to read from or write to a removable magnetic disk 720, and an optical disk drive 728 to read from or write to a removable optical disk 732 (e.g., a CD-ROM or DVD). The hard disk drive 730, magnetic disk drive 716 and optical disk drive 728 can be connected to system bus 706 the by an HDD interface 714, and FDD interface 718 and an optical disk drive interface 734, respectively. The HDD interface 714 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 708, and volatile 710, including an operating system 722, one or more applications 742, other program modules 724, and program data 726. In one embodiment, the one or more applications 742, other program modules 724, and program data 726 can include, for example, the various applications and/or components of the systems discussed herein.

A user can enter commands and information into the computer 702 through one or more wire/wireless input devices, for example, a keyboard 750 and a pointing device, such as a mouse 752. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 712 through an input device interface 736 that is coupled to the system bus 706 but can be connected by other interfaces such as a parallel port, IEEE 1394 serial port, a game port, a USB port, an IR interface, and so forth.

A monitor 744 or other type of display device is also connected to the system bus 706 via an interface, such as a video adapter 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer (s) 748. The remote computer(s) 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory and/or storage device 758 is illustrated. The logical connections depicted include wire/wireless connectivity to a local area network 756 and/or larger networks, for example, a wide area network 754. Such LAN and WAN networking environments are commonplace in offices and companies, and facilitate enterprise-wide computer networks, such as intranets, all of which may connect to a global communications network, for example, the Internet.

When used in a local area network 756 networking environment, the computer 702 is connected to the local area network 756 through a wire and/or wireless communication network interface or network adapter 738. The network adapter 738 can facilitate wire and/or wireless communications to the local area network 756, which may also include a wireless access point disposed thereon for communicating with the wireless functionality of the network adapter 738.

When used in a wide area network 754 networking environment, the computer 702 can include a modem 740, or is connected to a communications server on the wide area network 754 or has other means for establishing communications over the wide area network 754, such as by way of the Internet. The modem 740, which can be internal or external and a wire and/or wireless device, connects to the system bus 706 via the input device interface 736. In a networked environment, program modules depicted relative to the computer 702, or portions thereof, can be stored in the remote memory and/or storage device 758. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

What is claimed is:

1. A contactless card, comprising:
a substrate;
a first antenna embedded in the substrate;
a light-emitting diode (LED) embedded on the substrate;
a processor coupled with the first antenna; and
detection logic embedded in the substrate, the detection logic to couple the first antenna with the LED, the detection logic is configured to:
receive power generated by a magnetic field interacting with the first antenna, the magnetic field generated by an external device to perform a short-range wireless communication with the contactless card;
cause the LED to light a first color in response to detection of power via the first antenna by the detection logic; and
cause the LED to light a second color in response to a power level of the power received to perform the short-range wireless communication being above a threshold level required to perform the short-range wireless communication with the external device.

2. The contactless card of claim 1, wherein the detection logic comprises a resistor having a resistance to cause the LED to light based on the threshold level required to perform the short-range wireless communication.

3. The contactless card of claim 2, wherein the threshold level is set based on the short-range wireless communication completing within 500 milliseconds or less of receiving the power.

4. The contactless card of claim 1, wherein the short-range wireless communication is a near-field communication (NFC) read operation to provide data to perform a transaction.

5. The contactless card of claim 4, wherein the first antenna is configured to inductively couple with a second antenna of the external device using a frequency of 13.56 Megahertz (MHz) to perform the NFC read operation.

6. The contactless card of claim 1, further comprising switch circuitry to switch a current flow through the LED to change the LED from the first color to the second color after the power level is above the threshold level.

7. A contactless card, comprising:
a light-emitting diode (LED);
a chip comprising processing circuitry coupled with the LED;
a first antenna configured to energize in response to a signal communicated at a short-range wireless communication frequency;
a detection logic circuit coupled with the first antenna to cause the LED to light a first color after power detection via the first antenna; and
memory configured to store detection logic code, the detection logic code, when executed by the processing circuitry, to cause the processing circuitry to:
detect a power level of power generated by a magnetic field interacting with the first antenna, the magnetic field generated by an external device to perform a short-range wireless communication with the contactless card;
cause the LED to light a second color in response to the power level of the power received being above a threshold level required to perform the short-range wireless communication with the external device;
detect the short-range wireless communication to read data from the memory;
determine the short-range wireless communication to read the data is complete; and
cause the LED to light a third color in response to determining the short-range wireless communication is complete.

8. The contactless card of claim 7, wherein the threshold level is set to a threshold power level such that the short-range wireless communication completes within 500 milliseconds or less after detecting the power level.

9. The contactless card of claim 7, the processing circuitry to light the LED a third color if the power level is greater than zero and less than the threshold level.

10. The contactless card of claim 7, wherein the memory is configured to store the data to perform transactions, and the short-range wireless communication is a near-field communication (NFC) read operation to provide the data to perform the transactions.

11. The contactless card of claim 10, wherein the first antenna is configured to inductively couple with a second antenna of the external device using the short-range wireless communication frequency of 13.56 Megahertz (MHz) to perform the NFC read operation.

12. The contactless card of claim 7, comprising:
a substrate comprising one or more laminated layers,
wherein the first antenna is configured to communicate based on modulation of the magnetic field, and
wherein the LED, the chip, the memory, and the first antenna are embedded on the substrate.

13. The contactless card of claim 7, wherein the short-range wireless communication frequency is 13.56 Megahertz (MHz).

14. The contactless card of claim 7, the processing circuitry to transition the LED from the first color to the second color after the power level is above the threshold level.

15. A computer-implemented method, comprising:
inductively coupling, by a first antenna of a contactless card, with a second antenna of an external device;
detecting, by a detection logic of the contactless card, a power level of power generated by a magnetic field interacting with the first antenna, the magnetic field generated by the external device to perform a short-range wireless communication with the contactless card;
lighting, by a processor of the contactless card, an LED a first color in response to the power level of the power received being above a threshold level required to perform the short-range wireless communication with the external device;
lighting, by the detection logic, the LED a second color after power is detected via the first antenna;
detecting, by the processor, a near-field communication (NFC) read operation to read data from a memory coupled with the processor, the NFC read operation communicated via the first antenna inductively coupled with the second antenna;
determining whether the NFC read operation to read the data is completed successfully or unsuccessfully; and
lighting the LED a third color in response to determining the NFC read operation is completed successfully; or
lighting the LED a fourth color in response to determining the NFC read operation is completed unsuccessfully.

16. The computer-implemented method of claim 15, wherein the threshold level is set to a threshold power level such that the short-range wireless communication completes within 500 milliseconds or less after detecting the power level.

17. The computer-implemented method of claim 15, comprising lighting the LED a fifth color in response to the power level being above zero and less than the threshold level.

18. The computer-implemented method of claim 15, wherein the first antenna is configured to inductively couple with the second antenna at a frequency of 13.56 Megahertz (MHz) to perform the NFC read operation.

19. The computer-implemented method of claim 15, changing the LED from the first color to the second color after the power level is above the threshold level.

* * * * *